United States Patent [19]

Mackrle et al.

[11] 3,959,144

[45] May 25, 1976

[54] APPARATUS FOR BIOLOGICAL AND CHEMICAL PURIFICATION OF WATER BY AGGLOMERATION

[75] Inventors: Svatopluk Mackrle, Brno; Vladimir Mackrle, Prague, both of Czechoslovakia

[73] Assignee: Agrotechnika, narodny podnik, Zvolen, Czechoslovakia

[22] Filed: Nov. 15, 1974

[21] Appl. No.: 524,047

[52] U.S. Cl. ................................ 210/201; 210/218; 210/261; 210/512 R

[51] Int. Cl.[2] ........................ C02B 1/20; C02C 5/02

[58] Field of Search .................................... 210/3–8, 210/15, 20, 195, 197, 201, 208, 210, 252, 258, 259, 261, 262, 294, 512, 519, 540, 218

[56] References Cited

UNITED STATES PATENTS

| | | | |
|---|---|---|---|
| 3,307,702 | 3/1967 | Mackrle et al | 210/20 X |
| 3,403,096 | 9/1968 | Mackrle et al | 210/261 X |
| 3,524,810 | 8/1970 | Mackrle et al | 210/20 |
| 3,627,136 | 12/1971 | Mackrle et al | 210/201 |
| 3,815,750 | 6/1974 | Mackrle et al | 210/261 X |
| 3,842,004 | 10/1974 | Nagahama | 210/44 |

*Primary Examiner*—Charles N. Hart
*Assistant Examiner*—Robert H. Spitzer

[57] ABSTRACT

An apparatus for biological and chemical purification of water by agglomeration having a number of parallel, horizontal tanks, aligned side by side, the length of which is larger than their diameter, with inclined conduits advantageously tangential to both adjacent tanks connecting said tanks. The space determined by the inclined walls, adjacent upper parts of the mantles of the tanks, and by front and rear walls serve as a separating space for separating the floccular suspension from the purified water.

1 Claim, 6 Drawing Figures

A
A
A
S
S
D
D
1
2
3
4
5
6
7
8
9
10
11
12
13
15

1
2
3
4
6
8
9
10
11
12
13
14
15
23
I
III

VI
VII
IV
Z
H
S
F
1
3
4
8
15
16
17
18
19
21
22
23
24

APPARATUS FOR BIOLOGICAL AND CHEMICAL PURIFICATION OF WATER BY AGGLOMERATION

BACKGROUND OF THE INVENTION

The invention relates to an apparatus for biological and chemical purification of water by agglomeration composed of a substantial part of standard components.

Basic elements of known arrangements for water purification composed by standard elements, enabling a mass production and assembling, are large space tanks which are aligned horizontally with their axis parallel and which together form all spaces required for either a chemical or biological water purification. Separating spaced for separating the floccular suspension, created in the course of biological or chemical processes, are formed by upper parts of mantles of cylindrical tanks, aligned side by side. The maximum dimensions of the separating space of these arrangements are limited by the diameters of the cylindrical tanks.

A drawback of these arrangements is the limited separating space, because an insufficient separating space reduces the extent of an economic utilization of purification plants composed of standard elements. Thus for instance the application of similar arrangements for biological purification of sewage waste waters is limited to cases where the specific consumption of water does not exceed 150 liters per capita a day. Where the specific consumption of water exceeds this amount (it reaches generally even 300 liters per capita a day), an increase of the whole arrangement composed of standard elements is needed which is not proportional to the increased consumption, thus substantially increasing the investment costs. Similarly, the area of the separating surface is a limiting factor for arrangements for chemical purification of water if the specific output has to be increased. Another drawback of actually known water purification plants composed of standard elements is that, for instance, for biological purification, they need extensive elements built-in into cylindrical tanks, which in addition are different for different methods of purification and cause the basic standard elements of which the arrangement is composed to be non-uniform. The need of internal built-in elements increases the manufacturing costs and substantially reduces the possibility of unification of building elements, which is required for mass production.

It is an object of this invention to mitigate to a large extent these drawbacks and to provide an arrangement composed substantially of standard elements, which can be applied without large changes for both biological and chemical purification of water by agglomeration. The arrangement according to this invention is composed of at least two tanks with substantially cylindrical mantles, aligned side by side horizontally and with their axes parallel at a distance surpassing the diameter of the tanks, whereby adjacent tanks are mutually connected by inclined walls, which are advantageously tangential to the mantles of the tanks, these inclined walls, adjacent upper parts of the mantles of the tanks and front and rear walls determining a separating space for the separation of the floccular suspension from the purified water.

Exemplary embodiments of the object of this invention are shown in the attached drawings, wherein FIG. 1 is an arrangement for the biological purification of water in a cross-sectional view, the cross section being taken along planes indicated in FIG. 2 by the line I—I, FIG. 2 is the respective top view;

Figure 1:
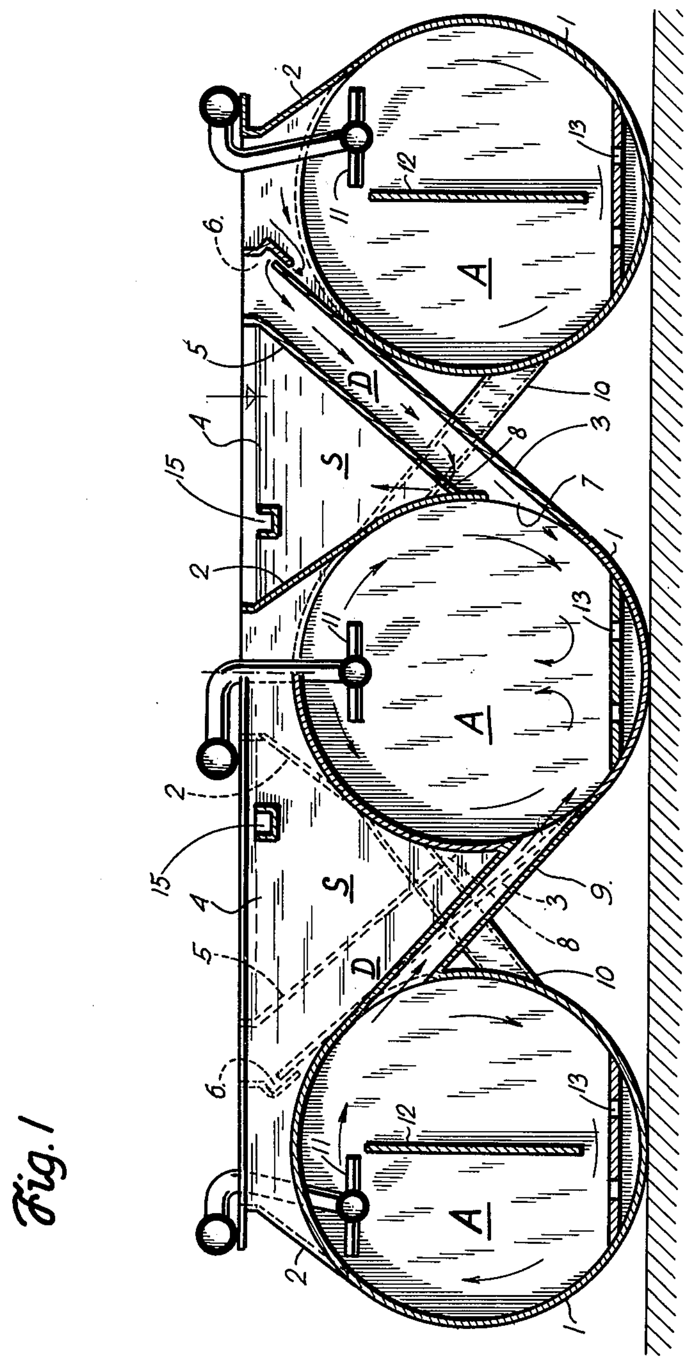
Figure 2:
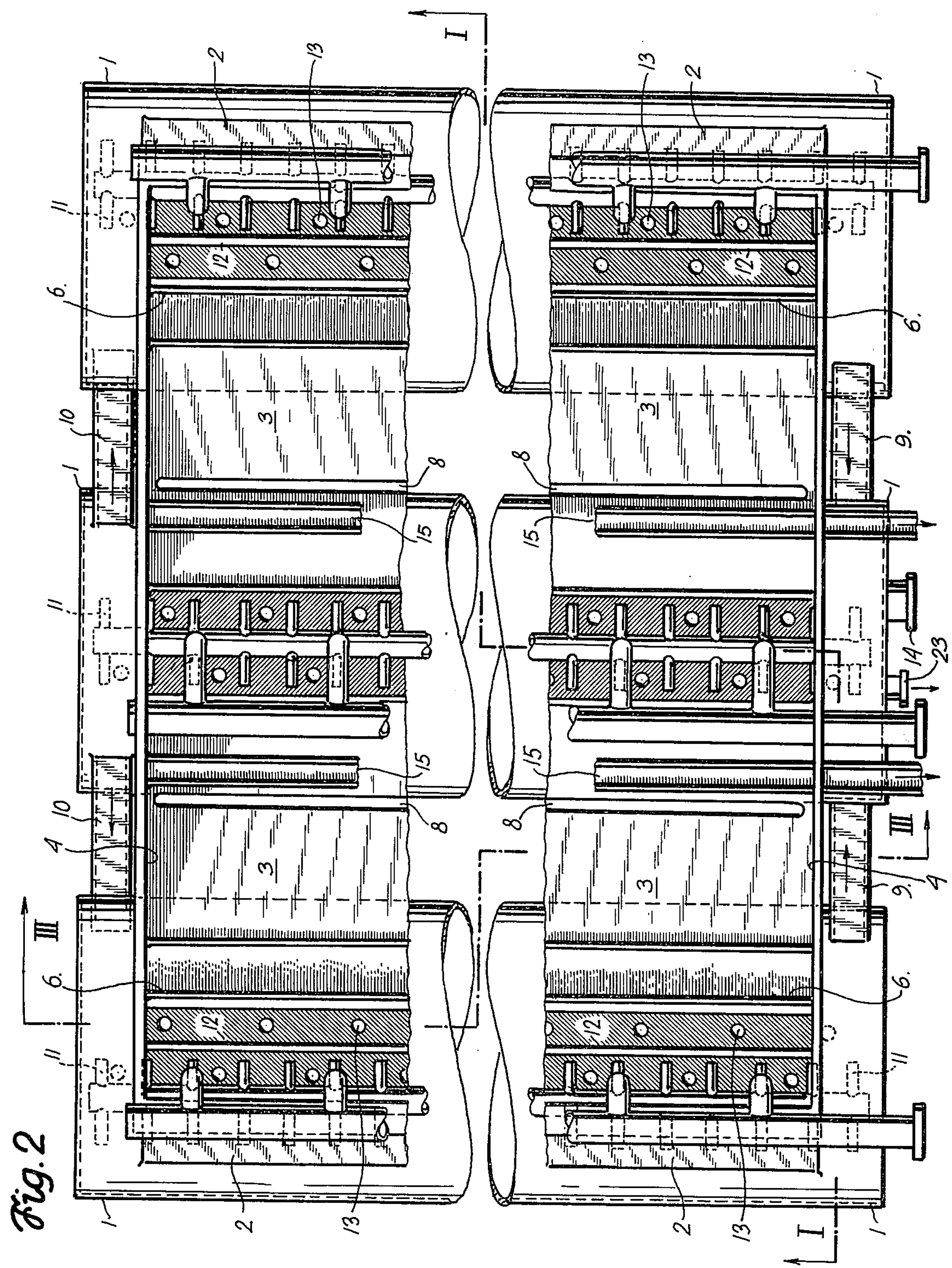
Figure 3:
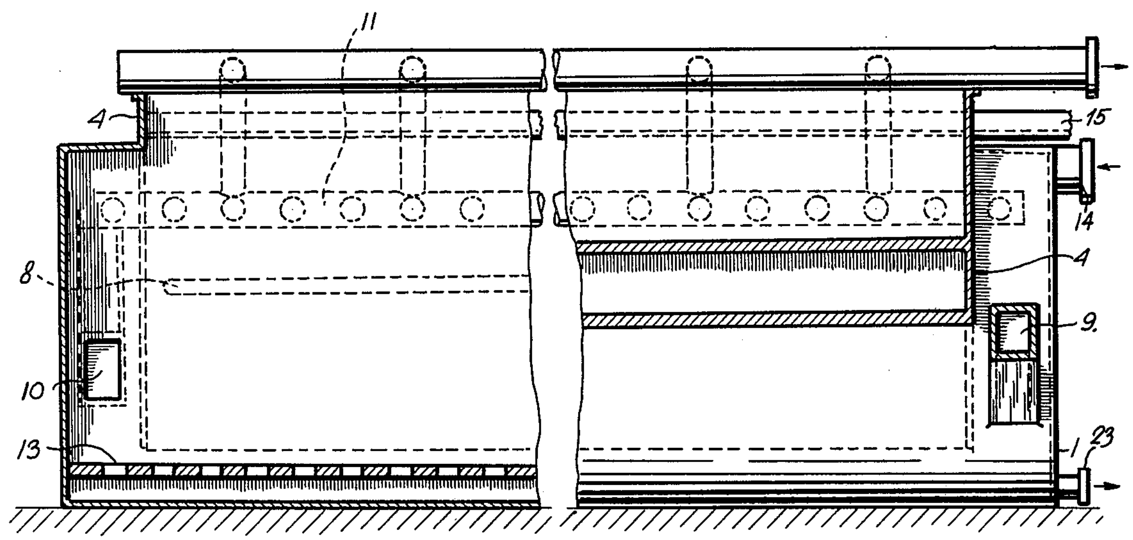
FIG. 3 is the respective cross-sectional side view, the cross section taken along planes, indicated in FIG. 2 by the line III—III.
Figure 6:
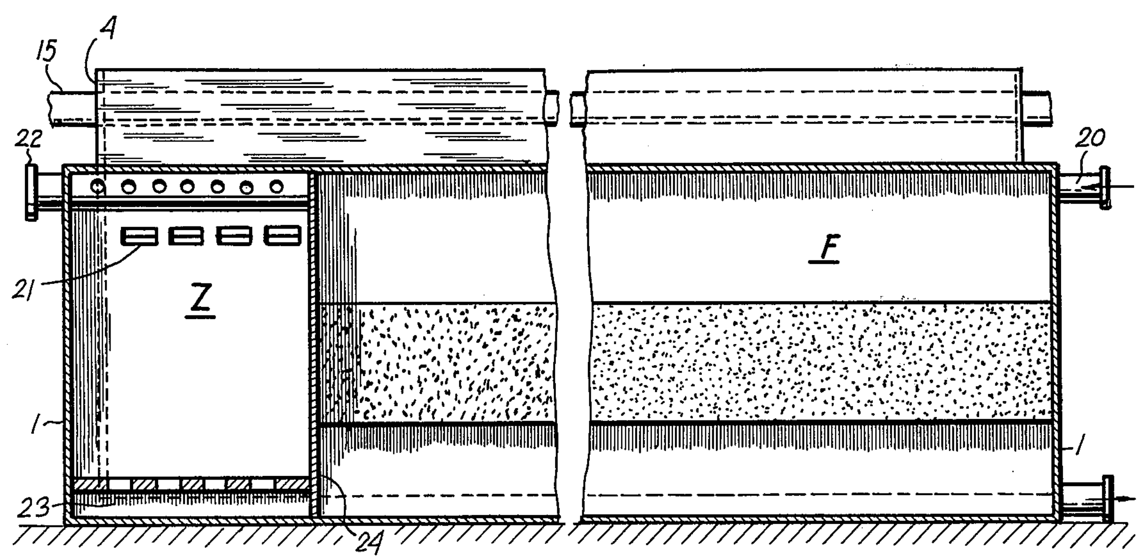
FIG. 6 is a side view in section, taken along a plane indicated in FIG. 4 by the line VI—VI.

The arrangement for biological purification of water shown in FIGS. 1, 2 and 3 comprises three horizontal tanks aligned side by side with cylindrical mantles 1 open at the top and passing over into conical extensions 2. The length of the adjacent tanks is larger than their diameter. Adjacent tanks are mutually connected by a conduit including an inclined wall 3 which is tangential to both mantles 1 of these tanks. The space of the cylindrical tanks forms an activating space A of the arrangement for biological purification of water. The area between both spaces, determined by the inclined wall 3, by adjacent upper parts of the mantles 1, and by the rear and front wall 4 of the apparatus form a separating space S. A degassing space D is separated from this space by means of a partition wall 5 inserted into the separating space S, said degassing space D communicating with the upper part of the external activating spaces A by openings 6 and with the lower part of the central activating space A by openings 7 in the mantle 1. The degassing space D also coomunicates with the separating space S by a slot 8. The activating spaces A at their front and rear ends are mutually connected by connecting channels 9 and 10 arranged tangentially to the mantles 1 so that the interconnection of adjacent tanks on opposite ends is in the opposite direction. The activating spaces A are provided with aerating means, composed of an aerating grid 11 submerged near the top of these spaces, which aerating grid 11 in the central activating space A is provided symmetrically with respect to the axis of the tank and in the external activating spaces A more close to the external wall of the tank. The external activating spaces A are provided with baffle walls 12. The activating spaces A have close to their bottoms collecting channels 13 for the removal of sludge. The arrangement has a single supply conduit 14 of raw water into the central activating space A. The purified water is collected in collecting troughs 15.

The described arrangement can be applied for extensive biological purification of waste waters with separation of the suspension by filtration by an imperfectly floating sludge blanket, or for an intensive biological purification of waste waters with separation of the suspension by a perfectly floating sludge blanket. An imperfectly floating sludge blanket is considered to be formed by a floccular suspension which is due to the supplied upstreaming water maintained partly in a floating condition, where, however, the floccular suspension is allowed to settle on the bottom of the separation space wherefrom it is drained. The speed of the water entering the separating space at the slot or opening at the bottom is so low that it does not prevent sedimentation. In case of a perfectly floating sludge blanket, the speed at which the water enters the separation space by way of a slot is so high that the floccular suspension cannot settle at the bottom and is due to the upstreaming water maintained as a blanket at a certain level of the separation space. The clarified water collects above this level of the floating sludge blanket and is taken off, for instance, by troughs, into which it is allowed to overflow. The excess floccular suspension is removed laterally at the level of the sludge blanket and allowed to concentrate in a space designed for this purpose. The difference in design for these two different applications is mainly in the width of the slot 8, in the size of the degassing spaces D and in the addition of a concentrating space Z if a separation with a perfectly floating sludge blanket is used. Such concentrating space is not shown in the drawings; however, it can advantageously be formed by the provision of a partition wall in one of the activating spaces A.

The described arrangement operates for an extensive biological purification of water with simultaneous stabilization of the sludge as follows:

The raw water enters via the supply conduit 14 for raw water into the central activating space A. The central activating space A is aerated by a shallowly immersed aerating grid 11 situated centrally with respect to the axis of the tank. Due to the air lift effect, an intensive agitating of the whole content of the central activating space A is achieved with the direction of the stream downwards along the circumference of the tank and upwards in the central part of the tank. After passing the central activating space A the cleaned water proceeds via the connecting channels 10 to the external activating spaces A due to an oppositely directed stream in the interconnected activating spaces and due to the tangential connection of the connecting channels 9 and 10 with respect to the mantles 1 of the tanks. The direction of the stream is also promoted in the external activating spaces A by shallowly immersed aerating grids 11, which are situtated in these tanks assymmetrically with respect to the axis of the tank causing a helicoidal streaming of the liquid, which has an upward direction in the part, where the aerating grids 11 are situated and a downward direction on the opposite side.

A part of the cleaned liquid, in the course of its passage through the external activating spaces A, is directed via the openings 6 into the degassing space D due to removal of the clarified water by the collecting troughs 15. In the course of the downward flow of the three phase mixture water-gas-solids, that is, the mixture of the cleaned water, the oxidizing gas, and suspended particles of the activated sludge, a separating of the gaseous phase and also a partial gravitational separation of the solid phase from the liquid takes place. In the lower part of the degassing space D the degassified and partially decanted water enters via the slot 8 provided between the partition wall 5 and the mantle 1 of the tank into the separating space S.

In case of a filtration by an imperfectly floating sludge blanket, the separation of the floccular suspension of the activated sludge takes place in the separation space S. Large and heavy particles of the suspension retained by the imperfectly floating sludge blanket pass due to gravitation through the slot 89 back into the degassing space D, from which the activated sludge returns via the openings 7 in the mantle 1 of the tank back into the central activating space A, thereby substantially promoting the efficiently of circulation. The optimum shapes of the degassing space D and of the separating space S and their advantageous mutual interconnection, together with the perfect solution of the return of the recirculated sludge back into the activating space A, secure a high effect of the separating process and of the recirculation of the sludge.

In the case of an extensive cleaning of waste waters with simultaneous stabilization of sludge, it is possible to achieve a surface load of the material surpassing 3 kg of dry sludge material at 1 $m^2$ per hour. The large separating surface of the described arrangement and the high efficiency of separation secures a correct functioning of the arrangement even in the case of a highly variable flow and at waste waters cleaning plants, where the specific consumption reaches 300 liters per capita a day, it is not necessary to increase the overall dimensions of the arrangement above the dimensions corresponding to values of the optimum load of the activating space A by organic materials.

The water which is not taken off from the degassing space D flows in the external activating spaces A along a helix to the other end of these activating spaces A and proceeds via the connecting channels 9 inclined in an opposite direction with respect to the connecting channels 10 due to an opposite direction of rotation in adjacent cylindrical tanks from the external activating spaces A back into the central activating space A together with the generated suspension of activated sludge. Due to the horizontal circulation, and due to recirculation of the activated sludge and a longitudinal mixing upon aerating, the conditions of the system of interconnected activating spaces A are similar to conditions prevailing in an ideally agitated space of a reactor with a homogenous three phase mixture in all activating spaces. There can therefore be a single supply conduit 14 of raw water to the central activating space A.

The activating spaces A, for the same functioning of the plant, can also be arranged so that the degassing spaces D can be directed toward the central activating space A and connect the upper part of this space A with the lower parts of adjacent external activating spaces A. The interconnection according to the first and second method enables the assembly of an arrangement for biological purification of water from any number of activating spaces A so that the number of separating spaces S will always be one less than the number of activating spaces A.

The described arrangement operates for biological purification without stabilization of sludge and with filtration in a perfectly floating sludge blanket as follows:

The width of the slot 8 is in this case selected so that the speed of flow in this slot 8 prevents any settlement in the separating space S, thereby also preventing any recirculation of the retained suspension of activated sludge from the sludge blanket back by gravitation into the activating process. It is therefore necessary to obtain a separation of a major part of the suspension prior to its entrance into the separating space S. This can be achieved by increasing the degassing space D, the shape and operation of which remains the same as in the earlier described case.

The water with lower concentration of the suspension enters from the lower part of the degassing space D via the slot 8 at a speed $v$ cm/sec into the separating space S. The liquid with higher concentration of the suspension returns back into the activating process via the openings 7 in the mantle 1. Thus a recirculation of the suspension is secured even in case of a perfectly floating sludge blanket is used for separation of the suspension. The excess suspension retained in the perfectly floating sludge blanket is taken off from its level into an independent concentrating space Z, which is not shown on the drawings, for which, however, a part of an activating space A can be used with advantage, obtained by separation by means of a lower partition wall. In that case the separated part of the cylindrical tank serving for concentration of the sludge is provided with an overflow at the level of the sludge blanket, by way of which the excess floccular suspension from the sludge blanket overflows into the concentrating space Z. The efficiency of separation in a perfectly floating sludge blanket is more than five times higher than the separation in an imperfectly floating sludge blanket. As the time for activation for intensive methods of biological purification is more than five times lower than for extensive purification with simultaneous stabilization of the sludge, it is possible to perform, with substantially the same arrangements with minor adjustments of design, two different methods of purification and thus to contribute to the versatility of their application.

Figures 4, 5:
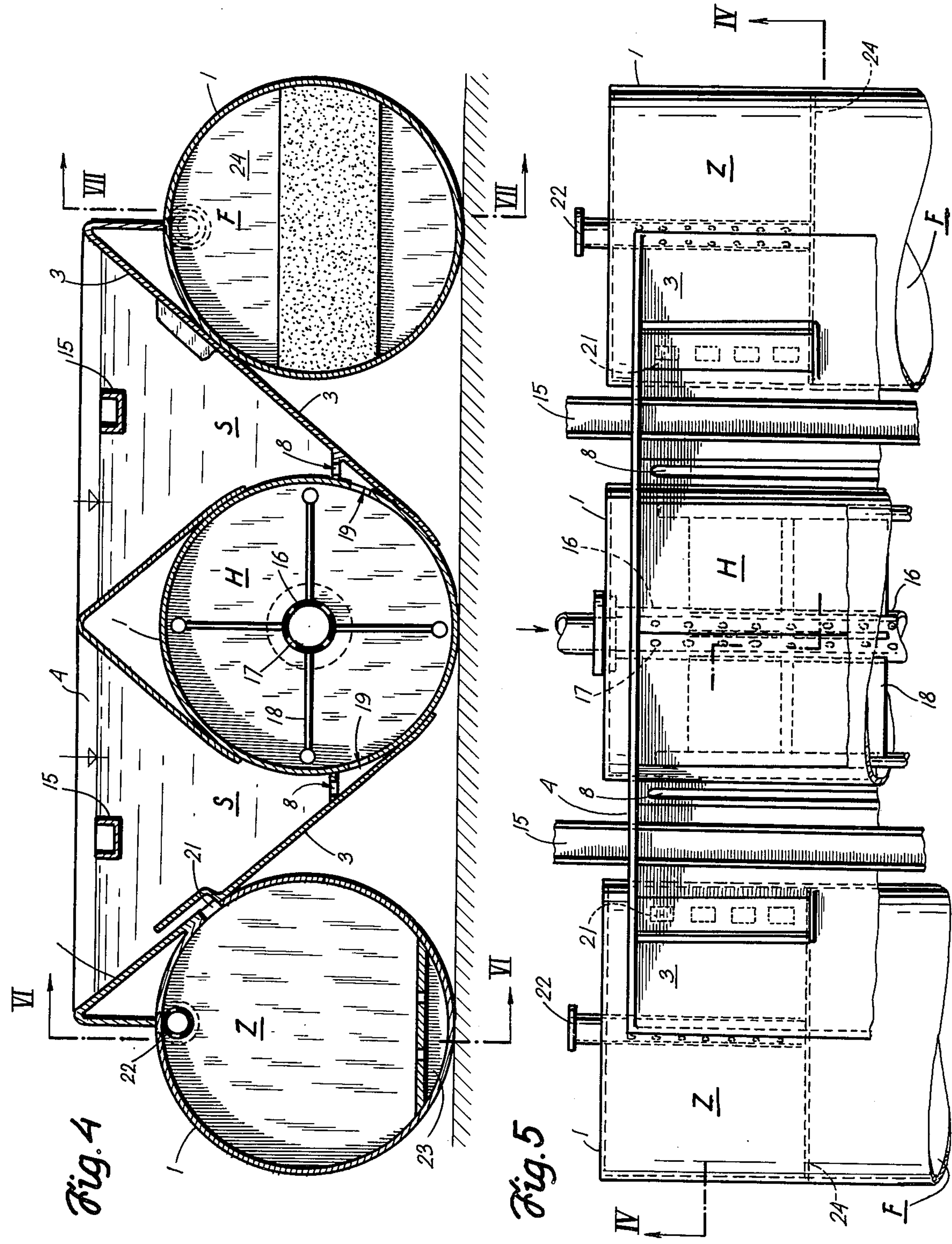
FIG. 4 is an arrangement for chemical purification of water in a cross-sectional view taken along planes indicated in FIG. 5 by the line IV—IV.
FIG. 5 is the corresponding top view.

The arrangement for chemical purification as shown in FIGS. 4 and 5 consists of three tanks with cylindrical, horizontal, closed mantles 1. The length of adjacent tanks is again larger than their diameter. Adjacent tanks are connected by inclined walls 3 which are tangential to both mantles 1 of the tanks. The central tank serves as an homogenizer H and is provided with a mechanical agitator consisting of a hollow shaft 16 with openings 17 and with paddles 18. The hollow shaft 16 is supported in bearings enabling its rotation, and the supply of raw water with dosed coagulating agents is accomplished from one end of the shaft 16. The shaft 16 is driven by an electric motor by way of transmission gears, situated outside the homogenizer H. The inclined wall 3, the adjacent upper parts of the mantles 1 and front and rear walls 4 on both ends of the tanks from a separating space S. Distributing openings 19 in the mantle 1 terminate in the lower part of the spearating space S connecting the separating space S with the homogenizer H. A slot 8 is provided above these distributing openings 19. The inclined walls 3 are also extended above the cylindrical tanks, thus widening the separating space S.

Collecting means for the purified water of the shape of collecting troughs 15 are disposed in the upper part of the separating space S. The purified water is led by a connecting conduit 20 to a mechanical filter F. Two horizontal cylindrical filters F are provided in both external tanks at both sides of the homogenizer H. A part of one of the external cylindrical tanks serves a concentrating space Z which is separated from the mechanical filter F by a partition wall 24. The separating space S at the level of the sludge blanket is connected with the concentrating space Z by openings 21. The concentrating space Z in its upper part is provided with means 22 for collecting decanted water, means 22 being also connected to the mechanical filters F. Take-off means 23 for concentrated sludge are provided at the bottom of the concentrating space Z. In FIG. 4 the left external tank is shown as a concentrating space Z, the right external tank as a mechanical filter F.

The described arrangement for chemical purification of water operates as follows:

The raw water with added coagulating agents enters the hollow shaft 16, which is rotating, being driven by an electric motor with transmission gears. The water flows at constant speed through the openings 17 in the hollow shaft 16 into the homogenizer H. Due to the movement of paddles 18 fixed to the rotating hollow shaft 16 the required turbulence for homogenizing the floccular suspension is achieved prior to its separation. The water with homogenized particles of the floccular suspension flows through the distributing openings 19 below the slot 8; such slot 8 has a width securing an optimum inlet spaced into the separating space S in order to create a perfectly floating sludge blanket at such location. This optimum speed is of the order of cm/sec. The purified water is taken off by way of collecting troughs 15 and passes via the connecting conduit 20 to the mechanical filters F, where it is filtered over a granular layer. The excess suspension is taken off from the level of the sludge blanket to the concentrating space Z via openings 21. The water decanted in the concentrating space Z is taken off to the mechanical filters F by collecting means 22 and the concentrated sludge is periodically removed from the bottom of the concentrating space Z by take-off means 23.

The concentrating space Z is situated in the described arrangement in a part of a tank of the horizontal cylindrical mechanical filter F. There are other possibilities of situating the concentrating space Z (which are not shown), which do not change the manner of operation of the whole arrangement.

The arrangement shown in FIG. 4 can also operate without major adjustments with other systems of separation of the suspension, as for instance with flotation. The arrangement remains the same in the case of application of flotation as indicated in FIG. 4, with the exception that no collecting troughs 15 are used for taking off the purified water. In the case of separation by flotation, the purified water is taken off from the separating space by a lower level take-off system (not shown). When using flotation, air is also introduced into the raw water in addition to coagulating agents, advantageously air absorbed in water at elevated pressure. The separated air bubbles sticking to particles of the homogenized suspension entering the separating space S via openings 13 taken along the suspension towards the level, where it is periodically scavenged into the concentration space Z. The purified water is taken off below the level at one side of the separating space, which in this case is not connected by openings 19 with the homogenizer H. The purified water is again passed to the mechanical filter F.

An advantage of the arrangement according to this invention is the ⅓ to ½ increase in the separating area with respect to prior known purification plants made of standard components. This increase of the separating area can be achieved both for biological and for chemical purification of water. The increase of the separating area of purification plants made of standard components enables, for chemical purification, an increase of the output proportional to the increase of the separating area, i.e. of ⅓ to ½. In arrangement of biological purification of water it is possible, due to the increase of the separating area and due to the increase of the efficiency of separation and recirculation of the suspension to achieve an increase of the peak throughflow of more than 50%. The increase of the separating area has, however, another substantial advantage for a biological purification of water in that it enables the formation of a degassing space outside the activating space. Thus the necessity of internal built-in elements in cylindrical tanks is eliminated; such built-in elements had to be different from known designs for different types of design of purification plants with standard components.

An advantage of the simplified design, where the fundamental elements of purification plants with standard components are reduced to simple cylindrical tanks, is the possibility of unification of these components, particularly in an unification of arrangements for extensive and intensive biological purification of water. This unification is of great importance to mass production, and contributes to the possibility of a further reduction of costs of similar plants. The solution of the degassing space according to this invention also offers, in addition to advantages of design and manufacture, advantages in operation due to the hydraulically advantageous forms of the arrangement. The hydraulically advantageous forms increase the efficiency of separation and recirculation of the suspension of the activated sludge, allowing a specified load of separation high above the customary value of 3 kg of dry sludge for 1 square meter an hour.

The increased efficiency of separation contributes to an increase of the output of the arrangement and to an increase of the allowed maximum peak value of throughflow. Another advantage of the arrangement for biological purification is the use of open tanks. The advantage of this solution is in that it permits the use of different kinds of cleaning systems, including aerating grids, which has been impossible with known purificating plants with standard components. The application of aerating grids contributes to the economization of operation, particularly to a decrease of power consumption.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An arrangement for biological and chemical purification of water by agglomeration, comprising at least two horizontal substantially aligned adjacently disposed tanks having elongated, substantially cylindrical jackets, a horizontally disposed vessel defining a separating space located between the upper parts of successive tanks, the tanks defining respective activating spaces therewithin, means for introducing raw water into the activating space within one of the tanks, conduit means with inclined walls connecting the upper portion of the activating space within one of the tanks with the lower portion of the activating space within the other of the tanks, the said inclined walls being generally tangential to the mantles of the said tanks, front and rear lateral walls closing the space within the conduit means determined by the inclined walls, a partition wall provided in the separating space above the inclined wall of at least one of the respective conduit means, the said partition wall determining, with said inclined wall, a degassing space for the separation of gases from the cleaned water prior to its entrance into the separating space, the degassing space being connected by openings with the upper part of one activating space and by other openings with the lower part of an adjacent activating space and in addition by a slot with the separating space, the conduit means being connected with the inner space of the tanks and serving for separating the floccular suspension, created in the course of purification of water, from the purified water, means for discharging purified water from the conduit means into the vessel, and means for collecting purified water in the upper part of the vessel.

* * * * *